United States Patent
Poddar et al.

(10) Patent No.: US 11,615,612 B2
(45) Date of Patent: Mar. 28, 2023

(54) SYSTEMS AND METHODS FOR IMAGE FEATURE EXTRACTION

(71) Applicant: TEXAS INSTRUMENTS INCORPORATED, Dallas, TX (US)

(72) Inventors: Deepak Kumar Poddar, Bangalore (IN); Soyeb Nagori, Bangalore (IN); Hrushikesh Tukaram Garud, Maharashtra (IN); Kumar Desappan, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 17/112,096

(22) Filed: Dec. 4, 2020

(65) Prior Publication Data
US 2022/0180476 A1    Jun. 9, 2022

(51) Int. Cl.
| | |
|---|---|
| *G06V 10/77* | (2022.01) |
| *G06T 3/40* | (2006.01) |
| *G06V 10/48* | (2022.01) |
| *G06V 10/46* | (2022.01) |
| *G06N 3/08* | (2006.01) |
| *G06N 3/084* | (2023.01) |

(52) U.S. Cl.
CPC ........ *G06V 10/7715* (2022.01); *G06T 3/4046* (2013.01); *G06V 10/462* (2022.01); *G06V 10/48* (2022.01); *G06N 3/084* (2013.01)

(58) Field of Classification Search
CPC .. G06V 10/7715; G06V 10/462; G06V 10/48; G06T 3/4046; G06K 9/6232; G06K 9/4671; G06K 9/4633; G06N 3/084
See application file for complete search history.

(56) References Cited

U.S. PATENT DOCUMENTS

| | | | | |
|---|---|---|---|---|
| 2019/0171871 | A1* | 6/2019 | Zhang | G06T 7/75 |
| 2019/0171909 | A1* | 6/2019 | Mandal | G06T 7/246 |

OTHER PUBLICATIONS

Hagihara et al, "Computer Vision-Based Approach for Quantifying Occupational Therapists' Qualitative Evaluations of Postural Control" (published in Occupational Therapy International, vol. 2020, Apr. 2020) (Year: 2020).*
Li et al, "End-to-End Learning Local Multi-view Descriptors for 3D Point Clouds" (published in 2020 IEEE/CVF Conference on Computer Vision and Pattern Recognition, pp. 1919-1928, Jun. 2020) (Year: 2020).*
Wojna et al, "The Devil is in the Decoder: Classification, Regression and GANs" (published in Computer Vision and Pattern Recognition, vol. 3, Feb. 2019) (Year: 2019).*

* cited by examiner

*Primary Examiner* — Casey L Kretzer
(74) *Attorney, Agent, or Firm* — Michael T. Gabrik; Frank D. Cimino

(57) ABSTRACT

This description relates to image feature extraction. In some examples, a system can include a keypoint detector and a feature list generator. The keypoint detector can be configured to upsample a keypoint score map to produce an upsampled keypoint score map. The keypoint score map can include feature scores indicative of a likelihood of at least one feature being present at keypoints in an image. The feature list generator can be configured to identify a subset of keypoints of the keypoints in the image using the feature scores of the up sampled keypoint score map, determine descriptors for the subset of keypoints based on a feature description map, and generate a keypoint descriptor map for the image based on the determined descriptors.

20 Claims, 8 Drawing Sheets

SYSTEMS AND METHODS FOR IMAGE FEATURE EXTRACTION

TECHNICAL FIELD

This description relates to image feature extraction, and, in particular, to image feature extraction for computer vision (CV) and imaging applications.

BACKGROUND

In deep learning, a convolutional neural network (CNN) is a class of deep neural networks that can be applied to analyzing visual imagery in CV and imaging applications. In CV and image processing, feature detection is used to compute abstractions of image information and make local decisions at image points whether there is an image feature of a given type at that point.

SUMMARY

In an example, a system can include a keypoint detector and a feature list generator. The keypoint detector can be configured to upsample a keypoint score map to produce an upsampled keypoint score map. The keypoint score map can include feature scores indicative of a likelihood of at least one feature being present at keypoints in an image. The feature list generator can be configured to identify a subset of keypoints of the keypoints in the image using the feature scores of the upsampled keypoint score map, determine descriptors for the subset of keypoints based on a feature description map, and generate a keypoint descriptor map for the image based on the determined descriptors.

In another example, a method can include upsampling a keypoint score map to produce an upsampled keypoint score map. The keypoint score map can include feature scores indicative of a likelihood of at least one feature being present at keypoints in an image. The method can further include identifying a subset of keypoints of the keypoints in the image using the feature scores of the upsampled keypoint score map, determining descriptors for the subset of keypoints based on a feature description map, and generating a keypoint descriptor map for the image based on the determined descriptors.

In a further example, one or more non-transitory computer-readable media can include machine readable instructions. The machine readable instructions can be executed by a processor. The machine readable instructions can include a keypoint detector and a feature list generator. The keypoint detector can be programmed to upsample a keypoint score map to produce an upsampled keypoint score map. The keypoint score map can include feature scores indicative of a likelihood of at least one feature being present at keypoints in an image. The feature list generator can include a keypoint selector and a descriptor calculator. The keypoint selector can be programmed to identify a subset of keypoints of the keypoints in the image using the feature scores of the upsampled keypoint score map. The descriptor calculator can be programmed to determine descriptors for the subset of keypoints based on a feature description map and generate a keypoint descriptor map for the image based on the determined descriptors.

DETAILED DESCRIPTION

Figure 1:
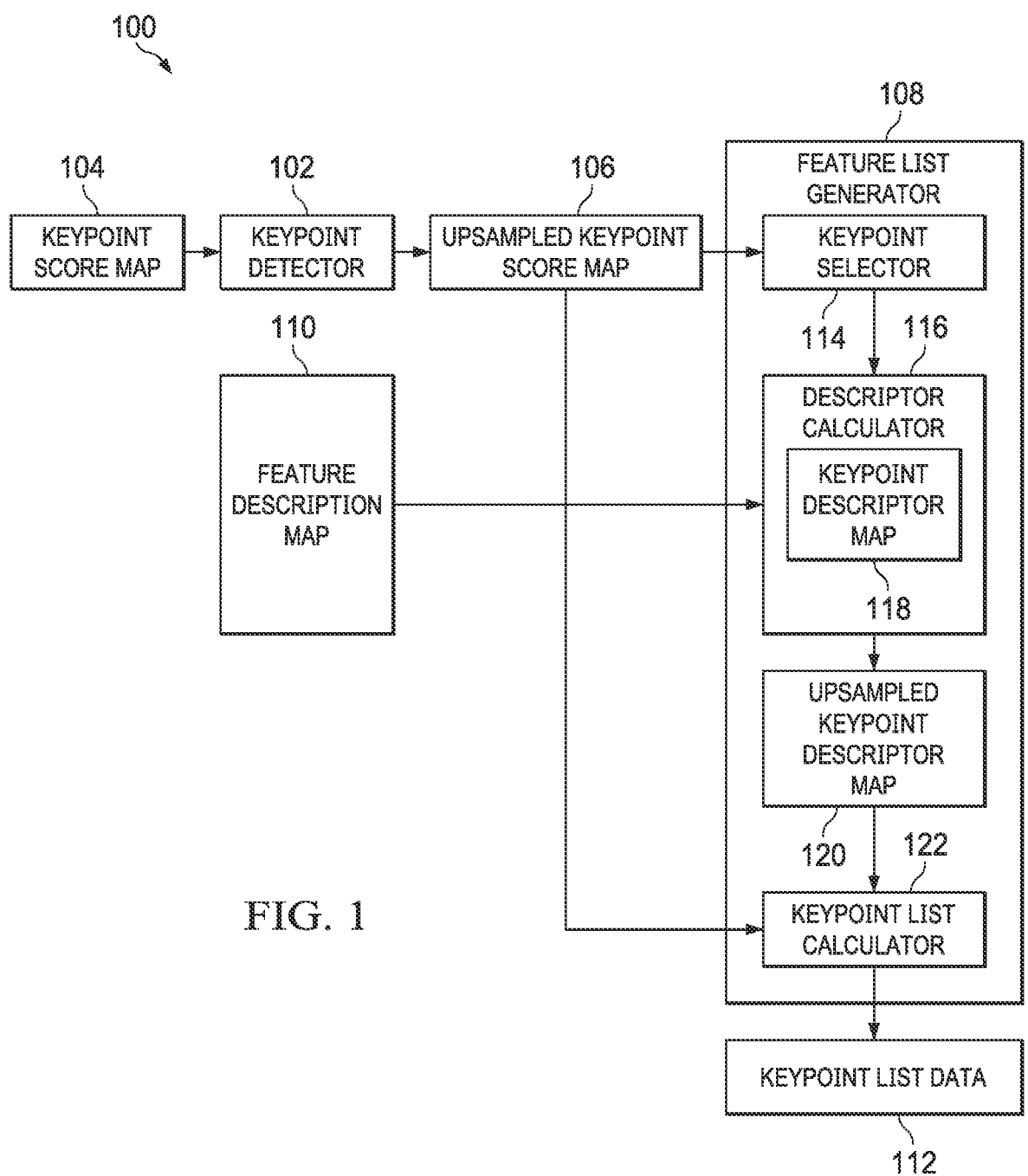
FIG. 1 is an example feature processing system.

This description relates to image feature extraction for CV and imaging applications. Systems and methods are described herein for feature extraction using a CNN. For example, the systems and methods described herein are used to compute a keypoint list based on an image. While examples are described herein for computing the keypoint list based on one or more images, in other example, the systems and methods described herein can be used for processing single or multidimensional signals to provide the keypoint list data. The image can be captured by an imaging system. By way of example, the imaging system is a camera. In some examples, the keypoint list identifies keypoints (e.g., pixel locations) in the image that are most likely to have at least one feature present therein. In some examples, the keypoint list can identify descriptors for the identified keypoints. Each descriptor can characterize a neighborhood of pixels for a respective keypoint. As an example, the descriptors can include a brightness, a color, and/or a texture. In other examples, the descriptors characterize additional or other attributes of the neighborhood of pixels for the respective keypoint. In some examples, the keypoint list data can identify KAZE descriptors, accelerated KAZE (AKAZE) descriptors, speeded up robust features (SURF) descriptors, or scale-invariant feature transform (SIFT) descriptors.

As a further example, an encoder-decoder neural network system is trained for feature extraction. The encoder-decoder neural network system can include an encoder neural network and a decoder neural network. The encoder neural network can be configured to encode the image to emphasize different features of the image. The encoder neural network can be configured to provide an encoded feature map that identifies each feature in the image. The decoder neural network can include a first set of layers and a second set of layers. Each of the first and second sets of layers can include an input layer, an output layer, and intermediate layers between the input and output layers. The first set of layers can be used to process the encoded feature map to decode the feature map. The first set of layers of the decoder neural network can decode the encoded feature map to compute a keypoint score map. The keypoint score can include feature scores indicative of a likelihood of at least one feature being present at keypoints in the image. The second set of layers of the decoder neural network can decode the encoded feature map to compute a feature description map.

In some examples, a processing (e.g., decoding) of the encoded feature map through the second set of layers can be terminated in response to the first set of layers decoding the feature map. In some examples, the processing of the encoded feature map through the second set of layers is terminated based on an output of an intermediate layer of the second set of layers. For example, the processing of the encoded feature map through the second set of layers can be terminated in response to detecting or receiving a feature description map generated by the intermediate layer. In some examples, the intermediate layer of the second set of layers is a layer immediately preceding the output layer of the second set of layers.

In some examples, a keypoint detector is configured to upsample the keypoint score map to produce an upsampled keypoint score map. The keypoint detector can be part of the decoder neural network. In other examples, the keypoint detector is external to the decoder neural network. The upsampled keypoint score map and the feature description map can be provided to a feature list generator. The feature list generator can be configured to determine descriptors for a subset of keypoints based on the feature description map. The feature list generator can be configured to generate a keypoint descriptor map for the image based on the determined descriptors. The feature list generator can be configured to upsample the keypoint descriptor map to produce an upsampled keypoint descriptor map. The upsampled keypoint score map and the upsampled keypoint descriptor map can have a similar plane size (e.g., similar length and width) as the image. The feature list generator can be configured to generate the keypoint list based on the upsampled keypoint descriptor map and the upsampled keypoint score map for further image processing.

Because the systems and methods described herein use the feature description map provided by the intermediate layer of the encoder-decoder neural network system for computing the keypoint descriptor map reduces a descriptor processing time. Existing CNN descriptor processing techniques rely on the feature description map produced at the output layer of the decoder neural network, which is dense and greater in size in contrast to the feature description map produced by the intermediate layer of the decoder neural network. Because the feature description map produced by the intermediate layer is used by the systems and methods described herein for computing the keypoint descriptor map and is smaller (e.g., spatial resolution) than the feature description map produced at the output layer improves the descriptor processing time. Additionally, data traffic to and from memory (e.g., Double Data Rate (DDR) type memory) for storing feature description map calculations is reduced as the intermediate layer produced feature description map has a smaller spatial resolution than a feature description map produced by an output layer of the decoder neural network. Moreover, because the feature description map produced by the intermediate layer is used for feature descriptor computation rather than the description map of the output layer, feature map description off-loading (e.g., data transfer) is not required, which further improves the descriptor processing time. Accordingly, because the systems and methods described herein compute descriptors for select locations in the image rather than all locations, the systems and methods described herein enable real-time processing of images (e.g., at 30 frames per second (FPS) or greater).

Figure 2:
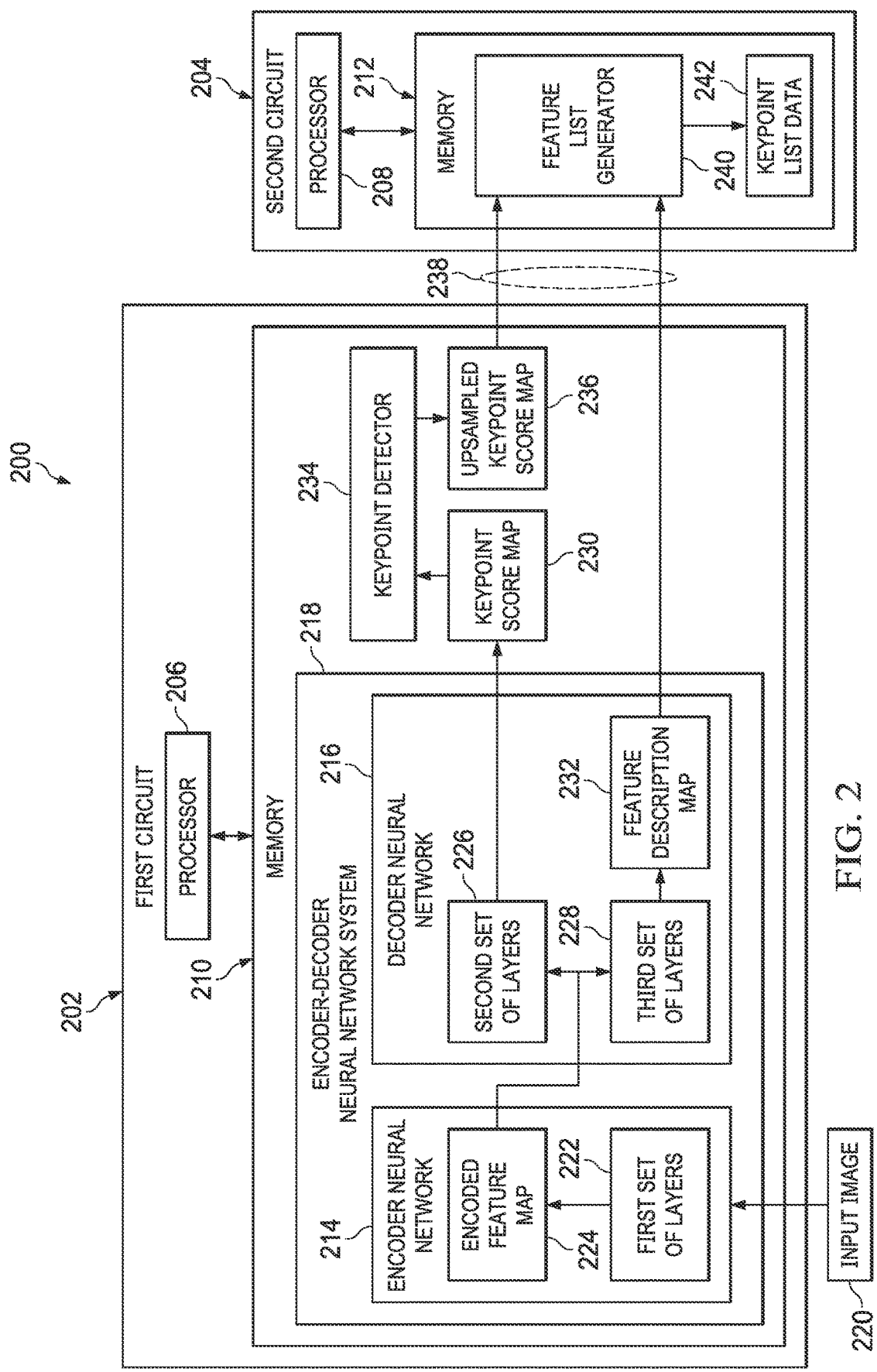
FIG. 2 is an example encoder-decoder system.

As used herein, the term "circuit" can include a collection of active and/or passive elements that perform an electronic circuit function, such as an analog circuit and/or digital circuit. Additionally or alternatively, for example, the term "circuit" can include an IC where all or some of the circuit elements are fabricated on a common substrate (e.g., semiconductor substrate, such as a die or chip) or within a common package herein. For example, the circuitry (e.g., a first circuit 202 and a second circuit 204, as shown in FIG. 2) can be implemented on a semiconductor substrate.

FIG. 1 is an example feature processing system 100. In some examples, the feature processing system 100 is implemented on a single circuit, and in other examples, the feature processing system is implemented on two or more circuits.

The feature processing system 100 includes a keypoint detector 102. The keypoint detector 102 can be configured to process a keypoint score map 104 to produce an upsampled keypoint score map 106. The keypoint score map 104 can be generated by a decoder neural network of an encoder-decoder neural network system based on a CNN architecture. The keypoint score map 104 can include feature scores indicative of a likelihood of at least one feature being present at keypoints (e.g. locations) in an image or a set of images. The image or the set of images can include at least one red-green-blue (RGB) image. The images can be provided by a camera. The term "keypoint" in CV and imaging applications refers to a point-of-interest in an image. As such, a keypoint is a point-of-interest at which a feature can be present in the image and thus is a spatial location in the image. A feature is a piece of information about a content of an image. For example, the feature can be a structure in the image, such as a point (e.g., corner point), edge, or object.

In some examples, the keypoint detector 102 is configured to transform a map size of the keypoint score map 104 from a first map size to a second map size. The term "map size" or "map resolution" as used herein can refer to a dimensionality of a map. Thus, a map can have a width, a height, and a depth. In some examples, the map can have a similar dimensionality as the image, and thus can be referred to as an image resolution. Thus, the keypoint detector 102 can upsample the keypoint score map 104 to provide the upsampled keypoint score map 106. The upsampled keypoint score map 106 can have a similar linear dimensionality (e.g., a length and a width) as the image. The feature processing system 100 can include a feature list generator 108. The feature list generator 108 can be configured to process the upsampled keypoint score map 106 and a feature description map 110 to compute keypoint list data 112. The feature description map 110 can be produced by an intermediate layer of the respective layers of the second processing path of the decoder neural network. The feature description map 110 can represent feature descriptors at a lower map resolution than a feature description map produced by a previous intermediate layer of the decoder neural network. Each feature descriptor of the feature description map 110 can characterize a neighborhood (e.g., of pixels) around a respective keypoint in the image. By way of example, the feature descriptors of the feature description map 110 are KAZE descriptors, and each feature descriptor can have 64 features to represent the respective keypoint in the image. In some examples, each feature descriptor is represented in the feature description map 110 as a respective plane having a similar length, width, and height. The feature descriptor maps can be stacked to define the feature description map.

The feature list generator 108 can include a keypoint selector 114. The keypoint selector 114 can be configured to evaluate the feature scores of the upsampled keypoint score map 106 to identify a subset of keypoints of the keypoints in the image that are most likely to have the at least one feature present therein. The keypoint selector 114 can be configured to evaluate the feature scores of the upsampled keypoint score map 106 relative to a score threshold. The keypoint selector 114 can be configured to identify the subset of keypoints of the keypoints based on the evaluation. For example, the keypoint selector 114 is configured to identify the subset of keypoints of the keypoints in response to determining that respective scores for the subset of keypoints of the keypoints that are greater than or equal to the score threshold. The keypoint selector 114 can be configured to provide the identified subset of keypoints of the keypoints in the image to a descriptor calculator 116 of the feature list generator 108.

The descriptor calculator 116 can be configured to process the feature description map 110 to compute descriptors for the identified subset of keypoints of the keypoints to generate a keypoint descriptor map 118. Each descriptor can characterize the neighborhood of pixels for the respective keypoint of the subset of keypoints at a greater map resolution in comparison to the feature description map 110 produced by the intermediate layer of the decoder neural network. Thus, the descriptor calculator 116 can be configured to upsample the feature description map 110 from a first map resolution to a second map resolution similar to an image resolution of the image to provide the keypoint descriptor map 118. Thus, the descriptor calculator 116 can be configured to sparsely compute the descriptors for the image based on the identified subset of keypoints of the keypoints from the upsampled keypoint score map 106. In some examples, the descriptor calculator 116 is configured to upsample the keypoint descriptor map 118 to produce an upsampled keypoint descriptor map 120. The upsampled keypoint descriptor map 120 can have a similar linear dimensionality (e.g., a length and a width) as the image.

In some examples, the feature list generator 108 includes a keypoint list calculator 122. The keypoint list calculator 122 can be configured to provide the keypoint list data 112 based on the upsampled keypoint score map 106 and the upsampled keypoint descriptor map 120. For example, the keypoint list calculator 122 is configured to identify the respective scores for the subset of keypoints of the keypoints from the upsampled keypoint score map 106, the determined descriptors from the upsampled keypoint descriptor map 120, and the subset of keypoints (e.g., locations) for the respective scores and the determined descriptors. The keypoint list calculator 122 can be configured to generate the keypoint list data 112 identifying a respective score, a respective location, and descriptor for each feature in the image. Accordingly, the feature processing system 100 can generate the keypoint list data 112 based on the descriptors computed for select locations in the image. The keypoint list data 112 can be used for imaging processing, for example, such as keypoint matching or image localization.

Because the feature processing system 100 uses the feature description map 110 provided by the intermediate layer of the encoder-decoder neural network system for computing the keypoint descriptor map 118 reduces a descriptor processing time. Existing CNN descriptor processing techniques rely on the feature description map produced by an output layer of the decoder neural network, which is dense and greater in size in contrast to the feature description map 110 produced by the intermediate layer of the decoder neural network described herein. Because the feature description map 110 produced by the intermediate layer contains sufficient feature description information for computing the keypoint descriptor map 118 and is smaller (e.g., in spatial resolution) than the feature description map produced by the output layer improves the descriptor processing time. Additionally, data traffic to and from memory (e.g., DDR type memory) for storing feature description map calculations is reduced as the intermediate layer produced feature description map has a smaller map resolution than a feature description map produced by an output layer of the decoder neural network. Moreover, because the feature description map 110 produced by the intermediate layer is used for feature descriptor computation, rather than the description map produced by the output layer of the decoder neural network, feature map description off-loading (data transferring) is not required, which further improves the descriptor processing time. For example, some existing systems need to transmit the feature description map produced by the output layer to an external circuit to free up internal circuit memory for keypoint descriptor map generation. Accordingly, because the feature processing system 100 computes descriptors for select locations in the image, rather than all locations, the approach described herein enables real-time processing of images (e.g., at 30 FPS or greater).

FIG. 2 is an example feature extraction system 200. The feature extraction system 200 can include a first circuit 202 and a second circuit 204. Each circuit 202 and 204 can include one or more processors 206 and 208 (e.g., a central processing unit (CPU)) and memory 210 and 212. As an example, the CPU is a complex instruction set computer (CISC)-type CPU, a reduced instruction set computer (RISC)-type CPU, or a microcontroller unit (MCU), or a digital signal processor (DSP). The CPU can be implemented as a graphics processing unit (GPU). In some examples, the first circuit 202 is configured as a hardware accelerator and the second circuit 204 is implemented as a DSP circuit. In other examples, the first circuit 202 can be implemented in a Field Programmable Gate Array (FPGA) device or an integrated circuit (e.g., an application-specific integrated circuit (ASIC) or system-on-chip (SoC)). In some examples, the first and second circuits 202 and 204 are implemented on the same IC, or in other examples, are implemented on separate ICs.

The memory 210 and 212 can include random access memory (RAM). Alternatively, the memory 210 and 212 may include another type of memory device (e.g., on-processor cache, off-processor cache, RAM, flash memory, or disk storage). The memory 210 and 212 can store coded instructions (e.g., computer and/or machine readable instructions) programmed to implement an image feature extraction application that includes a feature processing system, such as the feature processing system 100, as shown in FIG. 1. In some examples, some functions of the image feature extraction application are implemented by the first circuit 202 and other functions of the image feature extraction application are implemented by the second circuit 204. While the example of FIG. 2 shows the image feature extraction application as being implemented across two circuits (e.g., the first and second circuits 202 and 204), in other examples a single circuit or more than two circuits can be used to implement the image feature extraction application.

The first memory 210 includes an encoder neural network 214 and a decoder neural network 216. The encoder and decoder neural networks 214 and 216 can define an encoder-decoder neural network system 218. The encoder-decoder neural network system 218 can be trained for feature extraction based on an input image, which can include a set of images. For example, before detecting and classifying features in the input image, weights, and parameters (e.g., hyper-parameters) of the encoder-decoder neural network system 218 can be determined. The weights and parameters can be determined during a training process of the encoder and decoder neural networks 214 and 216.

During training of the encoder-decoder neural network system 218, a training image or images, in which scores and descriptors for the features have been detected and calculated, can be provided as the input to the encoder-decoder neural network system 218. Layers of the encoder-decoder neural network system 218 are applied to each training image and feature vectors of each image for each training image are determined (e.g., the features therein are detected and calculated). In some examples, the encoder-decoder neural network system 218 can be trained to compute keypoints and descriptors for each keypoint in training images to provide a ground truth for feature extraction during deployment. The feature vectors can be compared with pre-determined feature vectors. An error (e.g., a squared sum of differences, a log loss, a softmaxlog loss, and the like) between the feature vectors of the encoder-decoder neural network system 218 and the pre-determined feature vectors can be determined. The error can be used to update the weights and parameters of the encoder-decoder neural network system 218 in a backpropagation process which may include one or more iterations to improve the keypoint detection and description by the encoder-decoder neural network system 218.

In some examples, the encoder neural network 214 receives an input image 220, which can include one or more images captured by an imaging source (e.g., a camera). The input image 220 can have an image size. For example, the input image 220 can have a width, a height, and a depth that can be determined by the imaging source for producing the input image 220. In some examples, the input image 220 has more than one color channel (e.g., a red, green, and blue channel) and thus is multi-dimensional.

The encoder neural network 214 can be programmed with layers for decomposing the image into feature maps. For example, the encoder neural network 214 can include a first set of layers 222. The first set of layers 222 can be ordered (e.g., stacked) and can be referred to as a first layered image-processing pipeline. Thus, in some examples, a processing within the encoder neural network 214 can be sequential, such that each layer of the first set of layers 222 takes an input from a previous processing layer, and in some examples, from different layers of the encoder neural network. The first set of layers 222 can include any number of layers that can be based on a feature extraction application of the feature extraction system 200. As an example, the first set of layers 222 include a convolution layer, a rectified linear unit (ReLU) layer, and a batch normalization layer. In other examples, the first set of layers 222 can include any number of convolution layers, ReLU layers, max pooling layers, softmax layers, dropout layers, and/or fully connected layers.

The encoder neural network 214 can be programmed to process the input image 220 through the first layered image-processing pipeline to compute an encoded feature map 224. The encoded feature map can represent the image at a lower image resolution corresponding to a map resolution than the input image 220. Thus, the encoded feature map 224 can have a different dimensionality (e.g., a height, a width, and a depth) than the input image. For example, the first set of layers 222 of the encoder neural network 214 can include at least one convolution layer to compute feature maps that can be processed to provide the encoded feature map 224. Each feature map can emphasize a particular feature from the image (e.g., an edge, an object, etc.). Each feature map can have a map size. The depth of each feature map is determined based on a number of filters used at a respective convolution layer of the encoder neural network. A filter (also known as a kernel) is a set of weights (e.g., learned during training of the encoder-decoder neural network system 218) and can be represented as a filtering window.

The filtering window can be repeatedly applied to the input image 220 or an input feature map, such as wherein the input feature map is received at a subsequent convolution layer after the at least one convolution layer. The repeated application of the filter to the input feature map or the input image 220 results in an activation map. The activation map produced by a respective filter is a respective feature map. Each feature map can identify locations and strengths for a respective feature in the input image. In some examples, multiple different filters are repeatedly applied to the input feature map, each of which highlights a different feature in the image. In some examples, a feature map computed at a previous convolution layer of the first set of layers 222 is inputted to a subsequent convolution layer of the first set of layers 222 to generate a feature map that can emphasize different features than emphasized by the feature map computed at the previous processing layer of the first set of layers 222. In some examples, the first set of layers 222 include an output layer. The output layer of the first set of layers 222 can produce a feature map emphasizing different features in the image. The feature map produced at the output layer of the first set of layers 222 can be referred to as the encoded feature map 224 because this feature map includes feature maps emphasizing the different features in the image identified by each convolution layer of the first set of layers 222 preceding the output layer of the first set of layers 222.

In some examples, the decoder neural network 216 can be programmed to decode the encoded feature map 224. The decoder neural network 216 can include a second set of layers 226 and a third set of layers 228. Each of the second and third sets of layers 226 and 228 can include an input layer, convolution layers, deconvolution layers, ReLU layers, batch normalization layers, and/or an output layer. In some examples, the second and third sets of layers 226 and 228 include additional or different layers for decoding the encoded feature map 224. In some examples, a number of layers of each of the second and third sets of layers 226 and 228 are based on a number of layers used at the encoder neural network 214 or the feature extraction application of the system 200. Each of the first and second sets of layers 226 and 228 can be ordered (e.g., stacked) and can be referred to as respective second and third layered image-processing pipelines.

The second layered image-processing pipeline can process the encoded feature map 224 to compute a keypoint score map 230. The keypoint score map 230 can be provided by the output layer of the second set of layers 226. In some examples, the keypoint score map 230 can refer to the keypoint score map 104, as shown in FIG. 1. The second set of layers 226 can be programmed to compute for each keypoint (e.g., pixel location) in the input image 220 a score (e.g., a probability) indicative of a likelihood of at least one feature being present therein.

The third layered image-processing pipeline can be programmed to process the encoded feature map 224 to compute a description map having a first map size based on the encoded feature map 224. The description map having the first map size can be provided by the output layer of the third set of layers 228. By way of example, the output layer of the third set of layers 228 can include a resizing layer, a convolution layer (e.g., a depthwise separable filter), and a ReLU layer. However, before computing the description map having the first map size, the third layered image-processing pipeline can be terminated at an intermediate layer of the third set of layers 228. In some examples, the intermediate layer of the third set of layers 228 is a layer preceding the output layer of the third set of layers 228. In other examples, the intermediate layer is a respective layer between a second layer after the input layer and the output layer of the third set of layers 228. In further examples, the intermediate layer is a respective convolution layer of the third set of layers 228.

In some examples, the processing of the encoded feature map 224 through the third layered image-processing pipeline is terminated in response to the intermediate layer providing a feature description map 232. The feature description map 232 can have a second smaller map size (e.g., in spatial resolution) than the first map size of the feature description map produced at the output layer of the third set of layers 228. The processing of the encoded feature map through the third set of layers 228 can be monitored to detect the intermediate layer providing the feature description map 232. The feature description map 232 can have a map size that is smaller than the feature description map in examples wherein the third layered image-processing pipeline is not terminated at the intermediate layer. For example, the feature description map 232 has an image size that is a fraction of the description map produced by the output layer of the third set of layers 228.

In some examples, the first memory 210 includes a keypoint detector 234. In some examples, the keypoint detector 234 is employed as part of the decoder neural network 216. Thus, in some examples, the keypoint detector 234 can be employed as part of the second set of layers 226 and programmed to receive the keypoint score map 230 from the output layer of the second set of layers 226. By way of example, the keypoint detector 234 is representative of an upsampling layer for processing the keypoint score map 230 produced by the second set of layers 226. The upsampling layer of the keypoint detector 234 can include a resizing layer, a convolution layer, and a ReLU layer. In some examples, the keypoint detector 234 is the keypoint detector 102, as shown in FIG. 1. The keypoint detector 234 can be programmed to transform the keypoint score map 230 from a first map size to a second map size. Thus, the keypoint detector 234 can upsample the keypoint score map 230 to provide an upsampled keypoint score map 236. The upsampled keypoint score map 236 can have a similar linear dimensionality (e.g., a length and a width) as the image of the image 220.

In some examples, the first circuit 202 is configured to communicate with the second circuit 204 over a communication channel 238. As an example, the communication channel is a communication bus (e.g., one or more wires, traces, and the like). The keypoint detector 234 can be programmed to cause the first circuit 202 to communicate the upsampled keypoint score map 236 as a first set of signals (e.g., electrical, optical, and the like) over the communication channel 238 to the second circuit 204. The first circuit 202 can be configured to communicate the feature description map 232 as a second set of signals (e.g., electrical, optical, and the like) over the communication channel 238 to the second circuit 204. The first circuit 202 can include first circuitry for generating each of the first and second sets of signals for communication across the communication channel 238 to the second circuit 204. The second circuit 204 can include second circuitry for processing each of the first and second sets of signals to recover the feature description map 232 and the upsampled keypoint score map 236. The second memory 212 can include a feature list generator 240. In some examples, the feature list generator 240 is the feature list generator 108, as shown in FIG. 1. The feature list generator 240 can be programmed to generate keypoint list data 242 based on the feature description map 232 and the upsampled keypoint score map 236, as described herein. As such, the feature list generator 240 can be programmed to compute the upsampled keypoint descriptor map 120, as shown in FIG. 1, for generating the keypoint list data 242. In some examples, the keypoint detector 234 and the feature list generator 240 form the feature processing system 100, as shown in FIG. 1.

Because feature description map 232 from the intermediate layer of the third set of layers 228 of the decoder neural network 216 is used for computing the keypoint descriptor map, a descriptor processing time can be reduced compared to existing CNN descriptor processing techniques. Existing CNN descriptor processing techniques typically rely on a feature description map produced at the output layer of the third set of layers 228 of the decoder neural network 216 for keypoint description computation. The feature description map at the output layer of the third set of layers 228 is denser (e.g., has a greater spatial resolution) than the feature description map 232 provided by the intermediate layer of the third set of layers 228. Because the feature description map 232 of the intermediate layer contains sufficient feature descriptor information for computing the keypoint descriptor map and has a smaller size (e.g., a height, a width, and a depth) compared to the feature description map produced by the output layer of the third set of layers 228, descriptor processing time is improved.

Moreover, because the feature description map 232 provided by the intermediate layer of the third set of layers 228 is used for feature descriptor computation no off-loading (e.g., data transferring) is required of the feature description map produced by the output layer of the decoder (e.g., sending the feature description map produced by the output layer to an external circuit, such as the second circuit 204, as the map is being generated to free up an internal memory of the first circuit 202 for further generation of the map), which further improves the descriptor processing time. This is because the third set of layers 228 is terminated at the intermediate layer and the feature description map 232 of the intermediate layer is used for descriptor computation. Accordingly, because the feature extraction system 200 computes descriptors for select keypoints (e.g., locations) in the image rather than all locations enabling real-time processing of images (e.g., at 30 FPS or greater).

Figure 3:
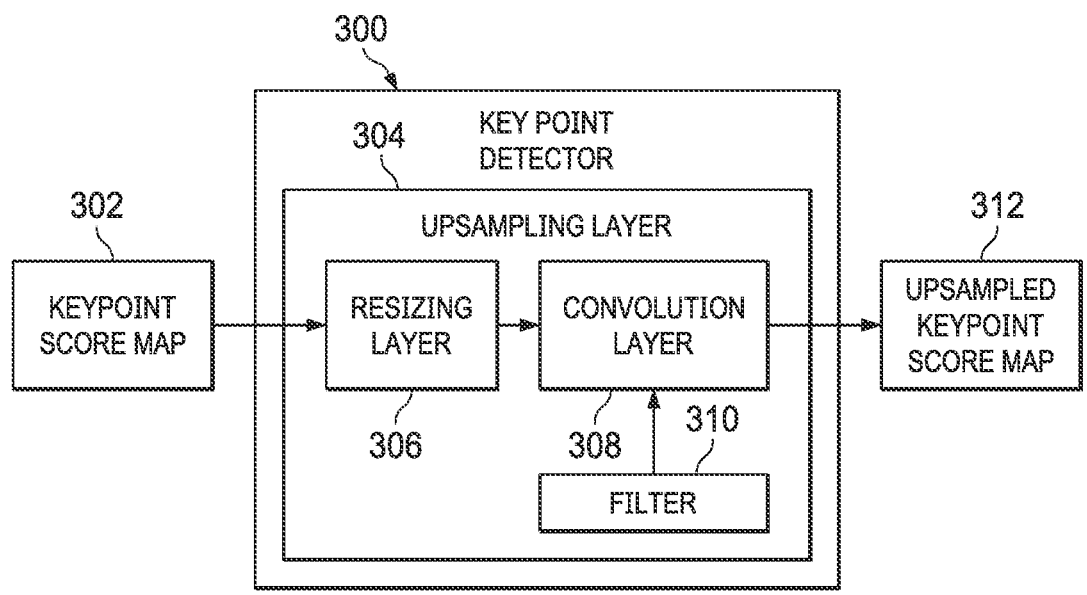
FIG. 3 is an example keypoint detector.

FIG. 3 is an example keypoint detector 300. In some examples, the keypoint detector 300 is the keypoint detector 102, as shown in FIG. 1, or the keypoint detector 234, as shown in FIG. 2. Therefore, the following description of FIG. 3 also refers to FIGS. 1-2. The keypoint detector 300 can be programmed to receive a keypoint score map 302. The keypoint score map 302 can be provided by a decoder neural network, such as the decoder neural network 216 shown in FIG. 2. The keypoint score map 302 can include feature scores indicative of a likelihood of at least one feature being present at keypoints in an image. The keypoint detector 300 can include an upsampling layer 304. While the example of FIG. 3 shows the keypoint detector 300 including a single layer for processing (e.g., transforming) the keypoint score map 302, in other examples, the keypoint detector 300 can include additional layers (e.g., a maxpooling layer and/or a ReLU layer). The upsampling layer 304 can be programmed to process the keypoint score map 302 to increase a map size of the keypoint score map 302 from a first map size to a second map size.

In some examples, the upsampling layer 304 includes a resizing layer 306 and a convolution layer 308. The resizing layer 306 can be programmed to increase the map size of the keypoint score map 302 from the first map size to the second map size. As an example, if the keypoint score map 302 is a single plane image (e.g., having a depth equal to one) with a map size that is a fraction of an image size of the image, the keypoint score map 302 can have a fractional map size. For example, if the image size of the image is h×w×d, the keypoint score map 302 can have the following map size $$\frac{h}{y} \times \frac{w}{y} \times 1,$$

wherein h is a height, w is a width, and y is a map size value that is a fraction of the image size of the image. The resizing layer 306 can be programmed to implement map resolution upscaling to resize the keypoint score map 302 from the first map size to the second map size to produce a resized keypoint score map.

In some examples, the resizing layer 306 can be programmed to use the keypoint score map 302 as a base map image and construct a resized map image based on a resizing ratio. The resizing ratio can define an amount that the base image is to be upscaled and thus can be similar to the fractional map size. For example, the resizing layer 306 can be programmed to map a score at each location of the keypoint score map 302 to respective locations in the resized keypoint score map based on the scaling ratio. The resizing layer 306 can be programmed to implement a nearest neighbor image scaling based on the following equation:

$$B_R[i][j] = B_o\left[\frac{i}{k}\right]\left[\frac{j}{k}\right], \quad (1)$$

wherein $B_o$ is the base map image, $B_R$ is the resized base map image, and $$\left[\frac{i}{k}\right]\left[\frac{j}{k}\right]$$

is the resizing ratio, i,j is a location in the resized base map image for a respective value (e.g., score) from the base map image that is to be mapped to the resized base map image, and k is scaling ratio indicative of a number of mappings for the respective value from the base map image to resized base map image.

For example, if k is 4, the resizing layer 306 can be programmed to map a score at a respective location in the keypoint score map 302 to 16 neighboring locations in the resized keypoint score map. Thus, a neighborhood of locations in the resized keypoint score map can have a similar score as the respective location in the keypoint score map 306 based on the mapping. By way of further example, if k is 4, each neighborhood of locations in the resized keypoint score map can have a height and width that is 4×4.

In some examples, the resizing layer 306 can be programmed to provide the resized keypoint score map to the convolution layer 308. The convolution layer 308 can be programmed to receive a filter 310. The filter 310 can have a defined size (e.g., a width, a height, and a depth). The filter 310 can be representative of weights determined during a training process of the keypoint detector 300. The convolution layer 308 can be programmed to convolve the resized keypoint score map with the filter 310 to produce an upsampled keypoint score map 312. The convolution layer 308 can be programmed to smooth the resized keypoint score map in spatial dimensionality to provide the upsampled keypoint score map 312. In some examples, the upsampled keypoint score map 312 is the upsampled keypoint score map 106, as shown in FIG. 1, or the upsampled keypoint score map 236, as shown in FIG. 2. In some examples, the convolution layer 308 can be programmed to pad (e.g., add zeros to edges of) the resized keypoint score map and convolve the padded keypoint score map with the filter 310 to produce the upsampled keypoint score map 312. As described herein, the upsampled keypoint score map 312 can be used for descriptor processing at a feature list generator, such as the feature list generator 108, as shown in FIG. 1, or the feature list generator 240, as shown in FIG. 2.

Figure 4:
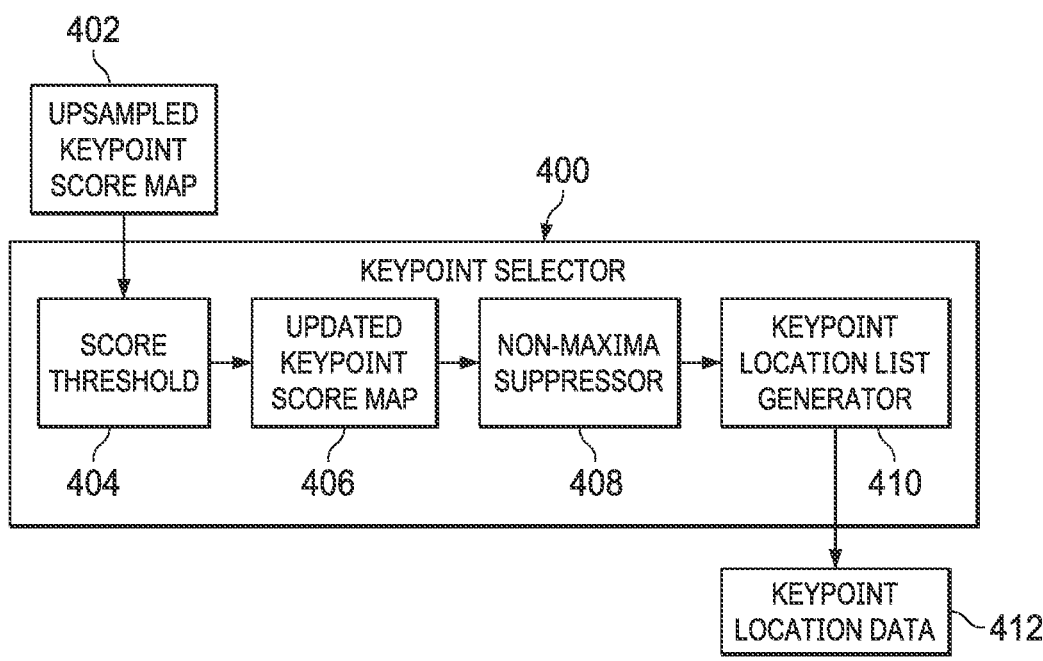
FIG. 4 is an example keypoint selector.

FIG. 4 is an example keypoint selector 400. In some examples, the keypoint selector 400 is the keypoint selector 114, as shown in FIG. 1. Therefore, the following description of FIG. 4 also refers to FIGS. 1-3. The keypoint selector 400 can be programmed to receive an upsampled keypoint score map 402. In some examples, the upsampled keypoint score map 402 is the upsampled keypoint score map 106, as shown in FIG. 1, the upsampled keypoint score map 236, as shown in FIG. 2, or the upsampled keypoint score map 312, as shown in FIG. 3. The upsampled keypoint score map 402 can identify feature scores for keypoints in an image. The scores can be indicative of a likelihood of at least one feature being present at the keypoints in the image.

The keypoint selector 400 can include a score threshold 404. The keypoint selector 400 can be programmed to evaluate the upsampled keypoint score map 402 relative to the score threshold 404 to identify a subset of keypoints of the keypoints in the image that are most likely to have the at least one feature therein. For example, the keypoint selector 400 is programmed to compare the feature scores of the upsampled keypoint score map 402 to the score threshold 404 to identify a subset of feature scores of the feature scores that is greater than or equal to the score threshold 404. The keypoint selector 400 can be programmed to identify the subset of keypoints of the keypoints based on the subset of scores. The keypoint selector 400 can be programmed to set each score at each location in the upsampled keypoint score map 402 that is less than the score threshold 404 to zero to provide an updated keypoint score map 406.

In some examples, the keypoint selector 400 includes a non-maxima suppressor 408 that can be programmed to implement non-maxima suppression (NMS) on the updated keypoint score map 406. In other examples, the score threshold 404 can be omitted, and the keypoint selector can be programmed to implement NMS on the upsampled keypoint score map 402. As an example, the non-maxima suppressor 408 is programmed to evaluate each neighborhood of locations in the updated keypoint score map to identify a maximum score for each neighborhood. Each neighborhood identified in the updated keypoint score map 406 (or the upsampled keypoint score map, in some examples) can have a defined width, height, and depth. As an example, if the neighborhood has a width, height, and depth that are 3×3×1, the non-maxima suppressor 408 can be programmed to implement 3×3 NMS, such that a score among scores in the 3×3×1 neighborhood that is a greatest is identified. The non-maxima suppressor 408 can be programmed to communicate each location for each score that is the greatest in each neighborhood to a keypoint location list generator 410 of the keypoint selector 400. The keypoint location list generator 410 can be programmed to provide keypoint location list data 412 based on each location provided for each score that is the greatest in each neighborhood. The keypoint location list data 412 can identify each location for each feature in the image that is associated with the greatest score among the scores in each neighborhood. The keypoint location list data 412 can be used for descriptor processing, such as described herein.

Figure 5:
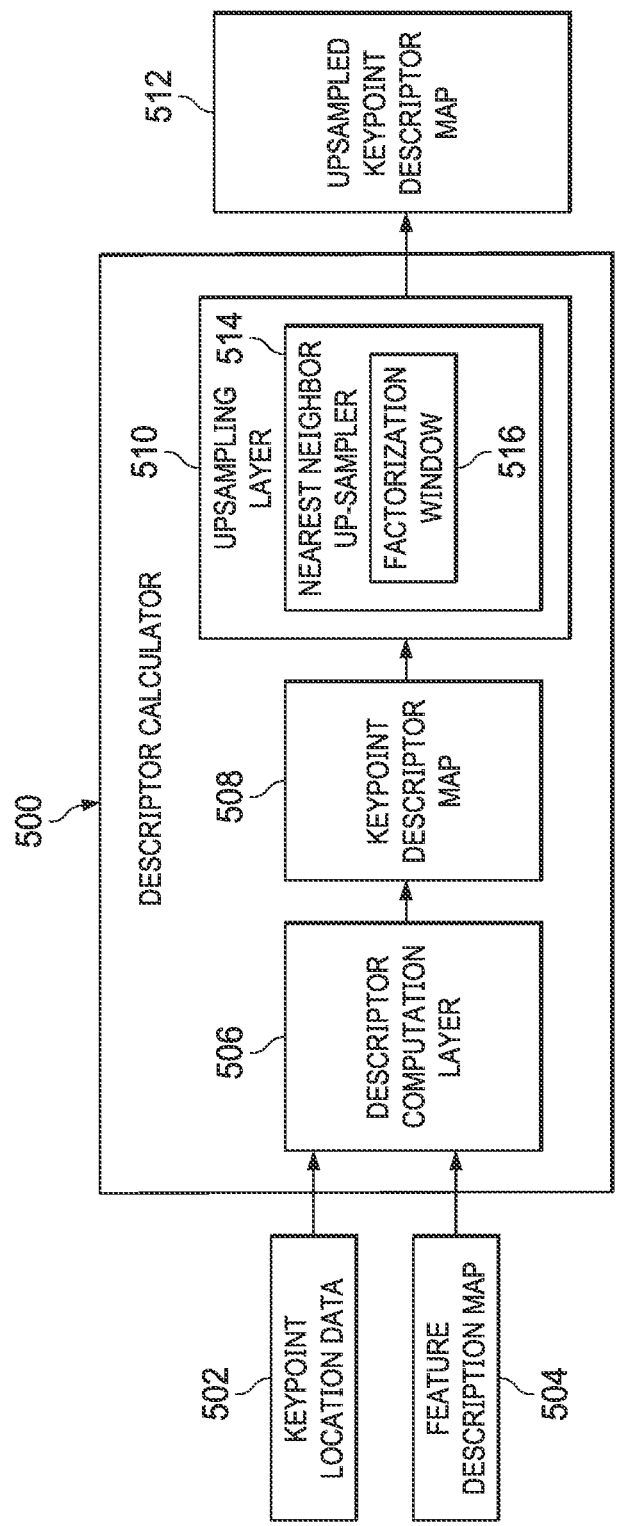
FIG. 5 is an example descriptor calculator.

FIG. 5 is an example descriptor calculator 500. In some examples, the descriptor calculator 500 is the descriptor calculator 116, as shown in FIG. 1. Therefore, the following description of FIG. 5 also refers to FIGS. 1-4. The descriptor calculator 500 can be programmed to receive or retrieve a keypoint location data 502. The keypoint location data 502 can be provided by a keypoint selector, such as the keypoint selector 114, as shown in FIG. 1, or the keypoint selector 400, as shown in FIG. 4. The keypoint location data 502 can identify each feature location (e.g., keypoint) for each feature in an image (e.g., the input image 220, as shown in FIG. 2) that is associated with a greatest score among scores in each neighborhood of a keypoint score map, such as, in some examples, the upsampled keypoint score map 402, or, in other examples, the updated keypoint score map 406, as shown in FIG. 4. In some examples, the keypoint score is the upsampled keypoint score map 106, as shown in FIG. 1, or the upsampled keypoint score map 236, as shown in FIG. 2

By way of example, the descriptor calculator 500 is programmed to receive or receive a feature description map 504. The feature description map can have a first image resolution different from an image resolution of the image. As described herein, the feature description map 504 can be provided by an intermediate layer of a set of layers of a decoder neural network, such as the decoder neural network 216 based on the encoded feature map 224, as shown in FIG. 2. Thus, in some examples, the set of layers is the third set of layers 228 of the decoder neural network 216, as shown in FIG. 2. As such, in some examples, the feature description map 504 is the feature description map 110, as shown in FIG. 1, or the feature description map 232, as shown in FIG. 2. The feature description map 504 can include at least one feature descriptor map that can emphasize a respective descriptor for at least one feature in the image.

In some examples, the feature description map 504 can include a stack of respective descriptor maps that emphasize a respective descriptor for each feature in the image. Thus, the feature description map 504 can have a map volume that has a depth dimension defined by a number of filters used at the intermediate layer of the third set of layers 228 of the decoder neural network 216, and a length and a width as defined by a length and a width of the filters used at the intermediate layer of the third set of layers 228. The filters can have a linear dimensionality (e.g., a length and a width) that is a fraction of an image size of the image. For example, if the image size of the image is h×w×d, then each filter used at the intermediate layer of the third set of layers 228 can have the following map size $$\frac{h}{z} \times \frac{w}{z} \times 1,$$

wherein h is the height, w is the width, and z is a fractional map size value. For example, if 64 filters are used at the intermediate layer of the third set of layers 228 for feature description map generation, and y=4, each filter has a map size of $$\frac{h}{4} \times \frac{w}{4} \times 1$$

and the feature descriptor map has a map volume that is $$\frac{h}{4} \times \frac{w}{4} \times 64.$$

Accordingly, in some examples, the feature description map 504 has a depth based on a number of filters used at the intermediate layer of the third set of layers 228 of the decoder neural network 216.

In some examples, the descriptor calculator 500 includes a descriptor computation layer 506. The descriptor computation layer 506 can be programmed to process the keypoint location data 502 to compute descriptors for the identified subset of keypoints of the keypoints in the feature description map 504 to generate a keypoint descriptor map 508. The keypoint descriptor map 508 can have a second image resolution different from the first image resolution of the feature description map 504. The second image resolution of the keypoint descriptor map 508 can be different from the image resolution of the image. For example, the descriptor computation layer 506 is programmed to identify descriptor locations in the feature description map 504 based on the keypoint locations of the keypoint location data 502. The descriptor computation layer 506 can be programmed to compute at least one descriptor for each identified descriptor location and thus for each feature in the image. For example, the descriptor computation layer 506 can be trained to calculate each value at each identified descriptor location of the feature description map 504 to compute the at least one descriptor for each identified descriptor location. The descriptor computation layer 506 can be programmed to output a keypoint descriptor map 508 based on the calculation. In some examples, the keypoint descriptor map 508 is the keypoint descriptor map 118, as shown in FIG. 1.

The descriptor calculator 500 can include an upsampling layer 510. In some examples, the upsampling layer 510 is implemented similar to the upsampling layer 304, as shown in FIG. 3. In examples wherein the upsampling layer 510 is implemented similar to the upsampling layer 304, the keypoint descriptor map 508 can be resized and convolved with at least one filter to provide an upsampled keypoint descriptor map 512 to have an image resolution similar to the image resolution of the image. In other examples, the upsampling layer 510 is programmed to employ a nearest neighbor resize process to upsample the keypoint descriptor map 508 to provide the upsampled keypoint descriptor map 512.

For example, the upsampling layer 510 includes a nearest neighbor upsampler 514. The nearest neighbor up-sampler 514 can be programmed to implement the nearest neighbor resize process followed by convolution as applying a factorization window 516 to the keypoint descriptor map 508 to produce the upsampled keypoint descriptor map 512. Each location of the factorization window 516 can be associated with a convolution weight. The nearest neighbor up-sampler 514 can be programmed to multiply descriptor values at locations of the keypoint descriptor map 508 with respective convolution weights of the factorization window 516 to produce the upsampled keypoint descriptor map 512.

Accordingly, the nearest neighbor up-sampler 514 can be programmed to apply a factorization process using the factorization window 516 to the keypoint descriptor map 508 to produce the upsampled keypoint descriptor map 512. In an example, the nearest neighbor up-sampler 514 implementing a scaling factor of k=4, and convolution with kernel of size 7×7 can be programmed to implement the factorization process for a keypoint descriptor at location (i,j) in the upsampled keypoint descriptor map 512, where mod (i, 4)=2 and mod (j, 4)=1, from keypoint descriptor map 508 as defined in the following equation:

$$\text{out}=a0=(w00+w0112)+a1=(w02+w03+w04+w05)+\ldots \\ \ldots c2\times(w56+w66) \quad (2)$$

wherein $$\begin{matrix} a0 & a1 & a2 \\ b0 & b1 & b2 \\ c0 & c1 & c2 \end{matrix}$$

represents a 3×3 neighborhood from the keypoint descriptor map 508 centered at a location $$\left[\frac{i}{4}\right], \left[\frac{j}{4}\right],$$

wXY represents the convolution weight at location (X, Y) in a convolution kernel, and out represents the upsampled keypoint descriptor map 512.

Figure 6:
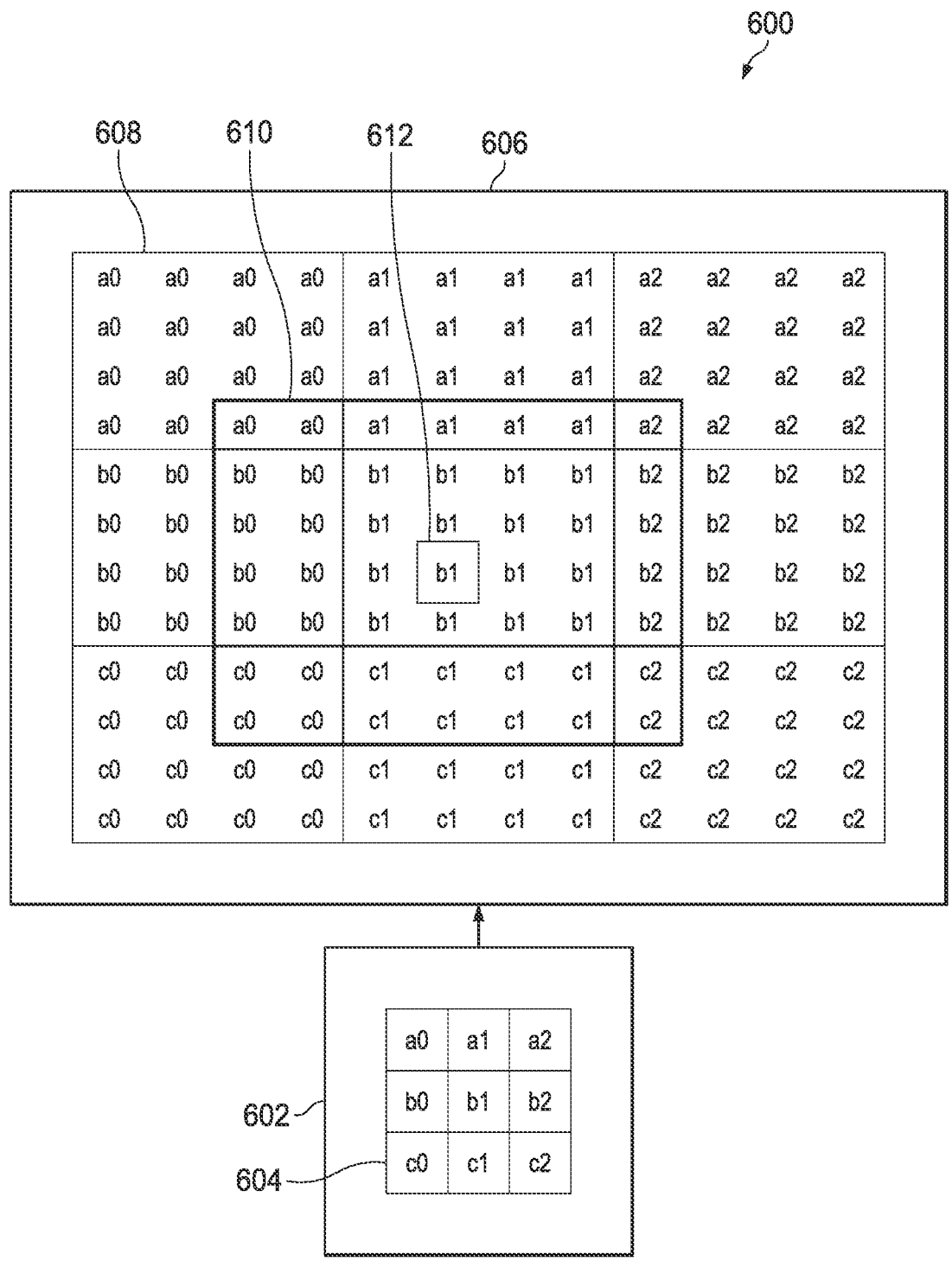
FIG. 6 is an example of nearest-neighbor upsampling.

FIG. 6 is an example 600 of nearest-neighbor based resize process of a portion of a keypoint descriptor map that can be implemented by an upsampling layer, such as the upsampling layer 510, as shown in FIG. 5. Therefore, the following description of FIG. 6 also refers to FIG. 5. At 602, a portion 604 of the keypoint descriptor map (e.g., the keypoint descriptor map 508, as shown in FIG. 1) is shown in the example of FIG. 6. At 606, a portion 608 of an output feature plane is shown in the example of FIG. 6. During the nearest-neighbor based resize process, the nearest neighbor up-sampler 514 can be programmed to apply a factorization window 610 to map respective descriptor values at locations of the portion 604 of the keypoint descriptor map to respective locations of the portion 608 of the output feature plane to transform the output feature plane into an updated keypoint descriptor map, such as the upsampled keypoint descriptor map 512, as shown in FIG. 5. In some examples, the factorization window 610 is the factorization window 516, as shown in FIG. 5.

Each location of the keypoint descriptor map can be associated with a respective equation similar to the equation (2) for transforming the output feature plane into the updated keypoint descriptor map. For each location in the portion 608 of the output feature plane, a value can be stored based on an output of the respective equation. For example, the nearest neighbor up-sampler 514 can be programmed to slide the factorization window 610 over the portion 608 of the output feature plane such that the factorization window is centered at a respective location b1 at 612 of the portion 608 of the output feature plane. The nearest neighbor up-sampler 514 can be programmed to compute a descriptor value for the location b1 at 612 based on an equation associated with a respective location of the factorization window 610 overlaying the location b1 at 612 and descriptor values at respective locations of the portion 604 of the keypoint descriptor map. The respective locations of the portion 604 of the keypoint descriptor map are identified as a0, a1, a2, b0, b1, b2, c0, c1, and c2 in the example of FIG. 6. In some examples, the portion 604 of the keypoint descriptor map is representative of a 3×3 neighborhood of the keypoint descriptor map 508. Thus, the nearest neighbor up-sampler 514 can be programmed to compute an upsampled keypoint descriptor value for the location b1 at 612 based on convolution weights associated with the respective location of the factorization window 610, as defined by equation (2).

For example, for each "b1" location as shown in FIG. 6, 16 equations similar to the equation (2) as described herein can be employed by the nearest neighbor up-sampler 514 to compute a respective value for each "b1" location. The nearest neighbor up-sampler 514 can be programmed to slide the factorization window 610 over the portion 608 of the output feature plane and multiply weights associated with a respective location of the factorization window 610 with the respective descriptor values of the portion 604 of the keypoint descriptor map. The nearest neighbor up-sampler 514 can be programmed to assign a product of the multiplication to a respective location of the portion 608 of the output feature plane. The nearest neighbor up-sampler 514 can be programmed to slide the factorization window 610 over the keypoint descriptor map for all locations to transform the output feature plane to provide the upsampled keypoint descriptor map 512. By using nearest neighbor based resizing process to implement resizing and filter convolving reduces descriptor computation processing costs as no interpolation techniques are needed to be implemented for the upsampling of the keypoint descriptor map. This is because a total number of multiplications implemented by the nearest neighbor up-sampler is reduced in contrast to using interpolation techniques for keypoint descriptor map upsampling.

Figure 7:
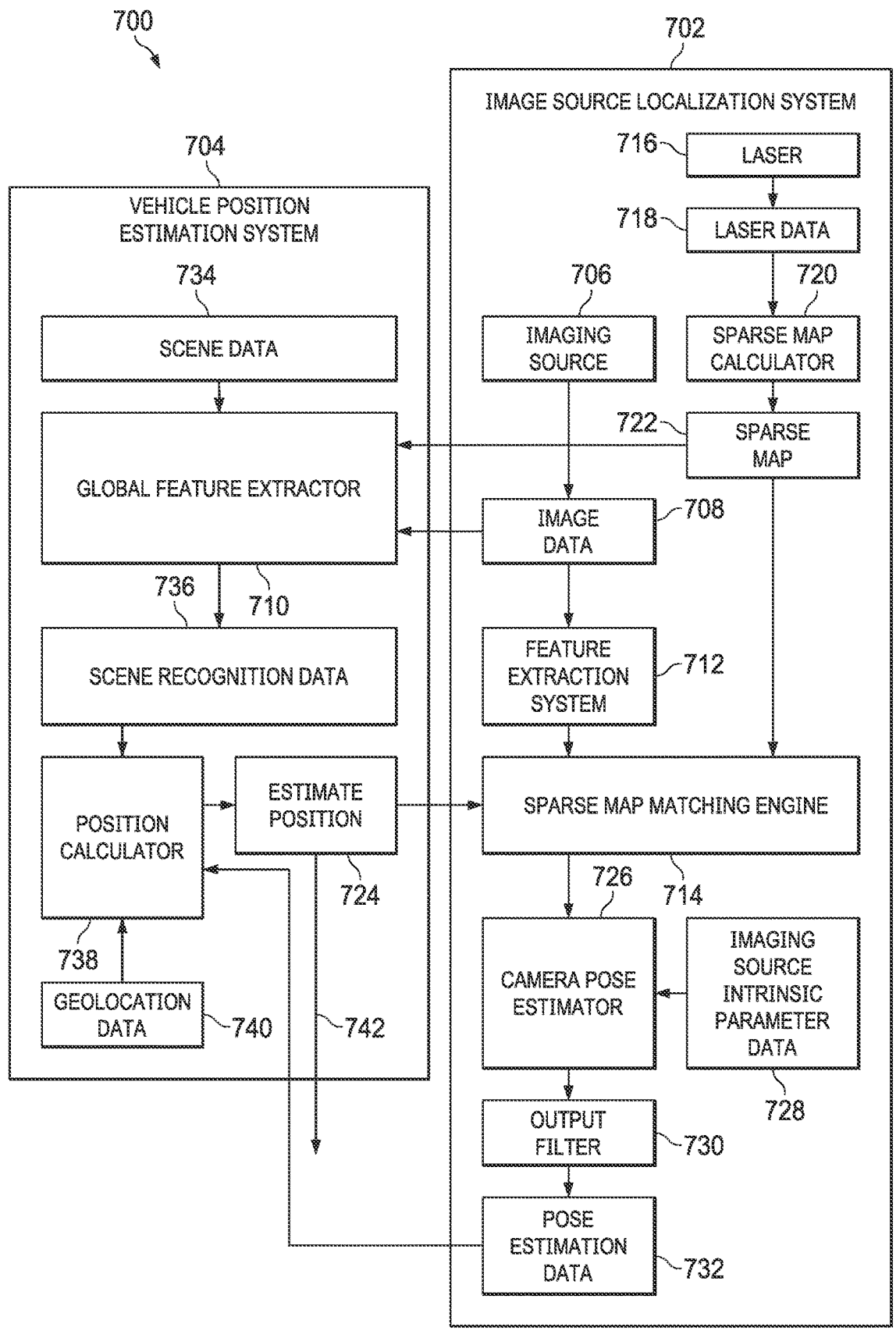
FIG. 7 is an example vehicle localization system.

FIG. 7 is an example vehicle localization system 700. The vehicle localization system 700 can include an image source localization system 702 and a vehicle position estimation system 704. The vehicle position estimation system 704 can be configured to estimate (or approximate) a position of a vehicle. The vehicle localization system 700 can be implemented on the vehicle for vehicle navigation, such as autonomous navigation of the vehicle. The image source localization system 702 can include an imaging source 706. For example, the imaging source 706 includes one or more cameras. The image source localization system 702 can be configured to compute a pose estimate for the image source 706 and provide the pose estimate to the vehicle position estimation system 704 for estimation of the vehicle position. The example of FIG. 7 shows the image source 706 as part of the image source localization system 702. In other examples, the image source 706 can be implemented outside the image source localization system 702.

The imaging source 706 can be configured to generate image data 708 characterizing an image of a scene. The image data 708 can be provided to a global feature extractor 710 of the vehicle position estimation system 704 and a feature extraction system 712 of the image source localization system 702. The feature extraction system 712 can be configured to implement feature extraction according to the systems and methods described herein. For example, the feature extraction system 712 is implemented as the feature extraction system 200 shown in FIG. 2. The feature extraction system 712 can be configured to output keypoint list data (e.g., the keypoint list data 112, as shown in FIG. 1 or the keypoint list data 242, as shown in FIG. 2) for use at a sparse map matching engine 714 of the image source localization system 702. In some examples, the image source localization system 702 includes a laser 716 configured to generate laser data 718. As an example, the laser data 718 characterizes laser scans of the scene. While FIG. 7 shows the laser 716 as part of the image source localization system 702, in other examples, the laser can be external to the image source localization system 702 and provide the laser data 718 to the image source localization system 702 (e.g., through an application programming interface).

The image source localization system 702 can include a sparse map calculator 720. The sparse map calculator 720 can be programmed to compute a sparse map 722 based on the laser data 718. For example, the sparse map 722 can include topological information that can be used for navigation of the vehicle and pose estimation. In some examples, the sparse map 722 can contain additional information about the scene (e.g., environment) such as demarcated drivable areas, road signs, and/or road marking details. The sparse map 722 can be provided to the global feature extractor 710 and the sparse map matching engine 714. The sparse map matching engine 714 can be programmed to process the keypoint list data outputted by the feature extraction system 712, the sparse map 722, and an estimate position 724 for the vehicle to provide a set of three-dimensional (3-D) image points in the image and respective two-dimensional (2-D) projections in the image.

The image source localization system 702 can include a camera pose estimator 726. The camera pose estimator 726 can be configured to receive the 3-D image points in the sparse image map, the 2-D projections in the image, and imaging source intrinsic parameter data 728 for the imaging source 706 to provide an initial pose estimation for the image source 706. The image source localization system 702 can include an output filter 730. The output filter 730 can be configured to output a pose estimation data 732 for the image source 706 based on the initial pose estimation. The output filter 730 can be configured to filter noise in obtained poses. For example, the pose estimation data 732 can provide a degree of freedom pose estimate for the image source 706. By way of further example, the pose estimation data 732 can provide a six degree of freedom (6-DOF) pose estimate for the image source 706.

By way of example, the global feature extractor 710 is configured to receive scene data 734 characterize different scenes (e.g., places). The global feature extractor 710 can be configured to process the sparse map 722 and the image data 708 to extract global features. For example, the global features can be a set of numerical values that can represent the scene as seen through the imaging source 706 for matching purpose. The global feature extractor 710 can be programmed to evaluate the extracted global features relative to the scene data 734 for scene recognition. In localization, the global features can be used to match the image with key frames in the scene data 734 using respective global feature descriptors to provide the scene recognition data 736 for estimating the position of the vehicle. The global feature extractor 710 can be programmed to generate scene recognition data 736 based on the evaluation. The vehicle position estimation system 704 can include a position calculator 738. In some examples, the position calculator 738 is programmed to receive or retrieve a geolocation data 740 for the vehicle. The position calculator 738 can be programmed to compute the estimate position 724 for the vehicle based on the pose estimation data 732, the scene recognition data 736, and/or the geolocation data 740. The estimate position 724 for the vehicle can be communicated to a vehicle control system, as shown at 742, for controlling the vehicle (e.g., autonomously or semi-autonomously).

Figure 8:
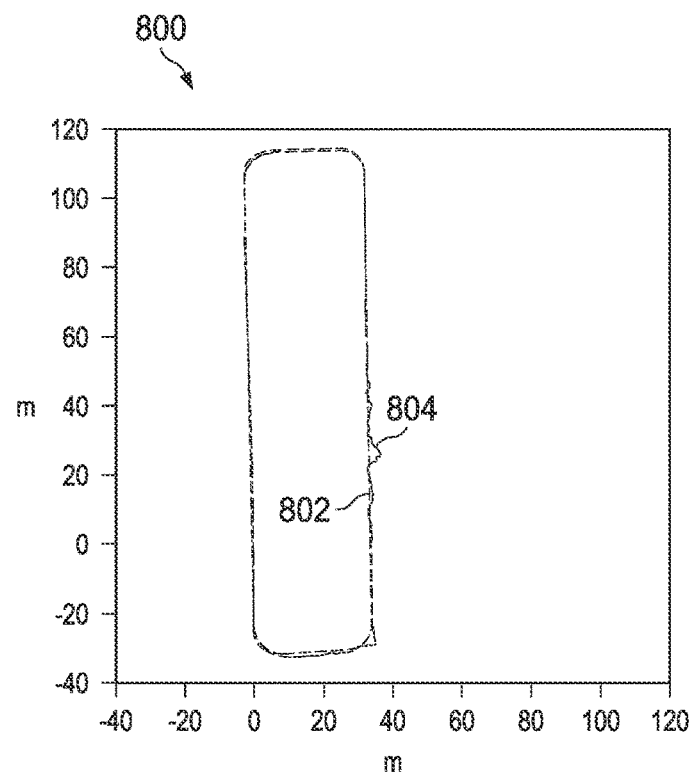
FIG. 8 is an example vehicle trajectory graph.
Figure 9:
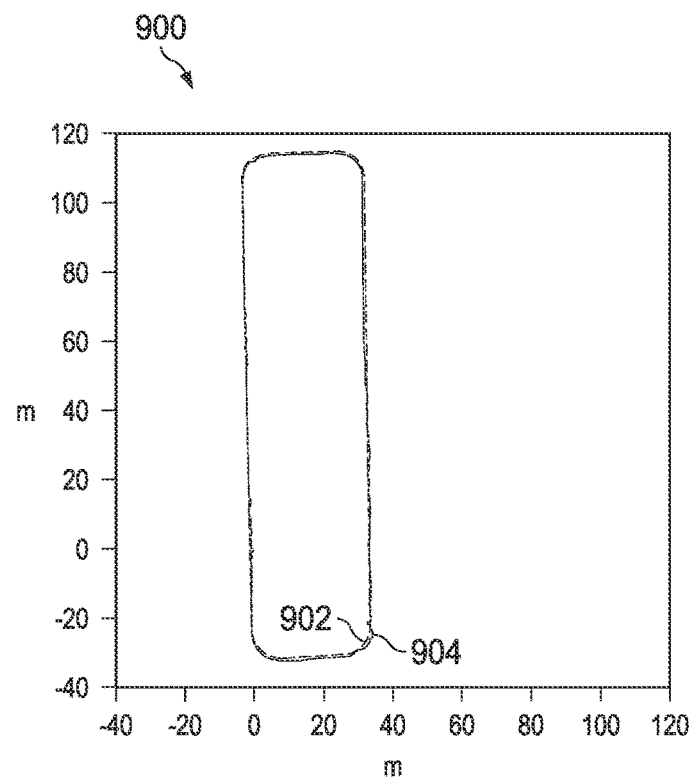
FIG. 9 is an example vehicle trajectory graph.

FIGS. 8-9 are examples of vehicle trajectory graphs 800. As shown in the example of FIGS. 8-9, a y-axis of each graph 800 and 900 represents a trajectory of a vehicle along a y-direction, and an x-axis of each graph 800 and 900 represents a trajectory of the vehicle along an x-direction. In some examples, a first vehicle is configured with a vehicle localization system configured with a feature extraction system configured to provide keypoint list data computed based on dense keypoint score maps and dense descriptor maps. In some examples, a second vehicle is configured with a vehicle localization system as described herein, such as the vehicle localization system 700, as shown in FIG. 7. Each of the graphs 800 and 900 includes a baseline trajectory 802 and 902. Each baseline trajectory 802 and 902 can be indicative of an intended trajectory for the vehicle. The graph 800 includes an estimated vehicle trajectory 804 of the first vehicle. The graph 900 includes an estimated vehicle trajectory 904 of the second vehicle. Because the second vehicle is configured with vehicle localization system 700, the second vehicle has improved localization (e.g., the estimated vehicle trajectory 904 more closely tracks the baseline trajectory 902 in the graph 900 in contrast to the estimated vehicle trajectory 804 and the baseline trajectory 802). The second vehicle has improved localization because a higher density of points, which increases a probability of finding a good match increases (e.g., in static or dynamic scenes).

Figure 10:
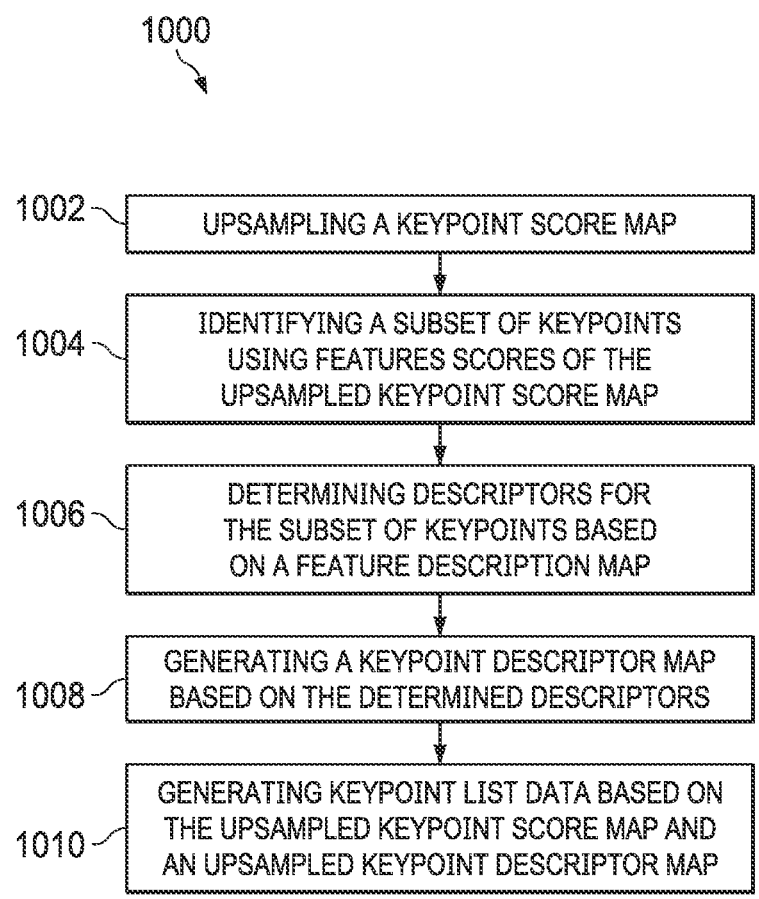
FIG. 10 is an example method for computing a keypoint descriptor map.

In view of the foregoing structural and functional features described above, an example method will be better appreciated with reference to FIG. 10. While, for purposes of simplicity of explanation, the example method of FIG. 10 is shown and described as executing serially, it is to be understood and appreciated that the example method is not limited by the shown order, as some actions could in other examples occur in different orders, multiple times and/or concurrently from that shown and described herein.

FIG. 10 is an example of a method 1000 for computing a keypoint descriptor map. For example, the method 1000 can be implemented by the feature processing system 100, as shown in FIG. 1. Therefore, the following description of FIG. 10 also refers to FIGS. 1-7. In some examples, the method 1000 can begin 1002 by upsampling (e.g., using the keypoint detector 102, as shown in FIG. 1) a keypoint score map (e.g., the keypoint score map 104, as shown in FIG. 1) to produce an upsampled keypoint score map (e.g., the upsampled keypoint score map 106, as shown in FIG. 1). The keypoint score map can include feature scores indicative of a likelihood of at least one feature being present at keypoints in an image. At 1004, a subset of keypoints of the keypoints can be identified (e.g., using the feature list generator 108, as shown in FIG. 1) in the image based on the feature scores of the upsampled keypoint score map. At 1006, descriptors for the subset of keypoints can be determined based on a feature description map (e.g., the feature description map 110, as shown in FIG. 1). At 1008, the keypoint descriptor map (e.g., the keypoint descriptor map 118, as shown in FIG. 1) can be generated for the image based on the determined descriptors. The keypoint descriptor map can be upsampled according to the examples described herein to provide an upsampled keypoint descriptor map (e.g., the upsampled keypoint descriptor map 120, as shown in FIG. 1). In some examples, at 1010, the method 1000 can include generating keypoint list data (e.g., the keypoint list data 112, as shown in FIG. 1) based on the upsampled keypoint score map and the upsampled keypoint descriptor map.

In this description and the claims, the term "based on" means based at least in part on.

Modifications are possible in the described embodiments, and other embodiments are possible, within the scope of the claims.

What is claimed is:

1. A system comprising:
a keypoint detector configured to upsample a keypoint score map to produce an upsampled keypoint score map, the keypoint score map comprising feature scores indicative of a likelihood of at least one feature being present at keypoints in an image; and
a feature list generator configured to:
identify a subset of keypoints of the keypoints in the image using the feature scores of the upsampled keypoint score map;
determine descriptors for the subset of keypoints based on a feature description map;
generate a keypoint descriptor map for the image based on the determined descriptors; and
apply a factorization window to the keypoint descriptor map to produce an upsampled keypoint descriptor map.

2. The system of claim 1, wherein the feature description map is provided by a decoder neural network, the decoder neural network comprising an input layer, an output layer, and intermediate layers between the input layer and the output layer, wherein one of the intermediate layers is configured to provide the feature description map.

3. The system of claim 1, wherein the feature list generator is further configured to apply a nearest neighbor resize process to the keypoint descriptor map to produce the upsampled keypoint descriptor map, the upsampled keypoint descriptor map having an image resolution that is similar to an image resolution of the image.

4. The system of claim 1, wherein the factorization window comprises locations associated with respective convolution weights, and applying the factorization window to the keypoint descriptor map comprises multiplying descriptor values associated with locations of the keypoint descriptor map with the respective convolution weights associated with the locations of the factorization window to produce the upsampled keypoint descriptor map.

5. The system of claim 1, wherein the keypoint detector is further configured to:
resize the keypoint score map from a first image resolution to a second image resolution; and
convolve the resized keypoint score map with at least one filter to provide the upsampled keypoint score map, the upsampled keypoint score map having an image resolution that is similar to an image resolution of the image.

6. The system of claim 5, wherein the keypoint detector is configured to resize the keypoint score map by implementing a nearest neighbor image scaling.

7. The system of claim 1, wherein the feature list generator is further configured to:
evaluate the feature scores relative to a feature score threshold to identify a subset of scores;
apply a non-maxima suppression to the subset of scores to identify a group of scores from the subset of scores; and
identify the subset of keypoints of the keypoints in the image based on the group of scores.

8. The system of claim 1, wherein the feature list generator is further configured to generate keypoint list data based on the upsampled keypoint score map and the upsampled keypoint descriptor map.

9. A method comprising:
upsampling a keypoint score map to produce an upsampled keypoint score map, the keypoint score map comprising feature scores indicative of a likelihood of at least one feature being present at keypoints in an image;
identifying a subset of keypoints of the keypoints in the image using the feature scores of the upsampled keypoint score map;
determining descriptors for the subset of keypoints based on a feature description map;
generating a keypoint descriptor map for the image based on the determined descriptors; and
applying a factorization window to the keypoint descriptor map to produce an upsampled keypoint descriptor map.

10. The method of claim 9, further comprising receiving from a decoder neural network the feature description map, the decoder neural network comprising an input layer, an output layer, and intermediate layers, wherein one of the intermediate layers is configured to provide the feature description map.

11. The method of claim 9, further comprising applying a nearest neighbor resize process to the keypoint descriptor map to produce the upsampled keypoint descriptor map, the upsampled keypoint descriptor map having an image resolution that is similar to an image resolution of the image.

12. The method of claim 9, wherein applying the factorization window to the keypoint descriptor map comprises multiplying descriptor values associated with locations of the keypoint descriptor map with respective convolution weights associated with the locations of the factorization window to produce the upsampled keypoint descriptor map.

13. The method of claim 9, further comprising:
resizing the keypoint score map from a first image resolution to a second image resolution by implementing a nearest neighbor image scaling;
convolving the resized keypoint score map with at least one filter to provide the upsampled keypoint score map, the upsampled keypoint score map having an image resolution that is similar to an image resolution of the image; and
generating keypoint list data based on the upsampled keypoint score map and the upsampled keypoint descriptor map.

14. The method of claim 9, further comprising:
evaluating the feature scores relative to a feature score threshold to identify a subset of scores;
applying a non-maxima suppression to the subset of scores to identify a group of scores from the subset of scores; and
identifying the subset of keypoints of the keypoints in the image based on the group of scores.

15. One or more non-transitory computer-readable media having machine readable instructions executable by a processor, the machine readable instructions comprising:
a keypoint detector programmed to upsample a keypoint score map to produce an upsampled keypoint score map, the keypoint score map comprising feature scores indicative of a likelihood of at least one feature being present at keypoints in an image; and
a feature list generator comprising:
a keypoint selector programmed to identify a subset of keypoints of the keypoints in the image using the feature scores of the upsampled keypoint score map; and
a descriptor calculator programmed to:
determine descriptors for the subset of keypoints based on a feature description map and generate a keypoint descriptor map for the image based on the determined descriptors; and apply a factorization window to the keypoint descriptor map to provide an upsampled keypoint descriptor map.

16. The one or more non-transitory computer-readable media of claim 15, wherein the descriptor calculator is further programmed to receive from a decoder neural network the feature description map, the decoder neural network comprising an input layer, an output layer, and intermediate layers, wherein one of the intermediate layers is programmed to provide the feature description map.

17. The one or more non-transitory computer-readable media of claim 15, wherein the descriptor calculator is further programmed to apply a nearest neighbor resize process to the keypoint descriptor map to produce the upsampled keypoint descriptor map, the upsampled keypoint descriptor map having an image resolution that is similar to an image resolution of the image, and wherein applying the factorization window to the keypoint descriptor map by multiplying descriptor values associated with locations of the keypoint descriptor map with respective convolution weights associated with the locations of the factorization window to produce the upsampled keypoint descriptor map.

18. The one or more non-transitory computer-readable media of claim 15, wherein the descriptor calculator is further programmed to:

resize the keypoint score map from a first image resolution to a second image resolution by implementing a nearest neighbor image scaling; and convolve the resized keypoint score map with at least one filter to provide the upsampled keypoint score map, the upsampled keypoint score map having an image resolution that is similar to an image resolution of the image.

19. The one or more non-transitory computer-readable media of claim 15, wherein the machine readable instructions further comprise a keypoint list calculator programmed to generate a keypoint list based on the upsampled keypoint score map and the upsampled keypoint descriptor map.

20. The one or more non-transitory computer-readable media of claim 15, wherein the keypoint selector is further programmed to:

evaluate the feature scores relative to a feature score threshold to identify a subset of scores;

apply a non-maxima suppression to the subset of scores to identify a group of scores from the subset of scores; and identify the subset of keypoints of the keypoints in the image based on the group of scores.

* * * * *